(12) United States Patent
Venkataswamy et al.

(10) Patent No.: US 6,368,700 B1
(45) Date of Patent: Apr. 9, 2002

(54) OLEFINIC SLIP-COATING FOR AUTOMOTIVE WEATHERSEALS

(75) Inventors: Krishna Venkataswamy; Angela Marie Person, both of Akron, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 09/393,731

(22) Filed: Sep. 10, 1999

(51) Int. Cl.[7] .............................. B32B 7/02; B32B 3/00; C08L 51/00; C08G 63/48; E04D 1/34
(52) U.S. Cl. .................. 428/217; 428/195; 525/66; 525/69; 52/402; 49/475.1
(58) Field of Search ................................ 428/217, 195; 49/475.1; 525/66, 69; 52/402

(56) References Cited

U.S. PATENT DOCUMENTS

| | | | |
|---|---|---|---|
| 4,423,185 A | 12/1983 | Matsumoto et al. | 525/66 |
| 5,343,609 A | * 9/1994 | McManus | 29/451 |
| 5,343,655 A | 9/1994 | Miyakawa et al. | 49/441 |
| 5,424,019 A | 6/1995 | Miyakawa et al. | 264/177.17 |
| 5,441,685 A | 8/1995 | Miyakawa et al. | 264/148 |
| 5,447,671 A | 9/1995 | Kato et al. | 264/148 |

FOREIGN PATENT DOCUMENTS

| | | | | |
|---|---|---|---|---|
| EP | 0860314 A1 | 8/1998 | ............ | B60J/10/00 |
| EP | 0 569 746 | 10/1998 | | |
| JP | 7346094 | 9/1995 | ............ | B32B/27/32 |
| JP | 9176408 | 9/1995 | | |

* cited by examiner

Primary Examiner—Cynthia H. Kelly
Assistant Examiner—J. Ferguson
(74) Attorney, Agent, or Firm—Alfred D. Lobo; William A. Skinner

(57) ABSTRACT

A weatherseal or belt-line seal for a vehicle is formed by extrusion of an olefin-based thermoplastic elastomer or vulcanizate (first TPV) as an elongate body of arbitrary length and cross-section. The cross-section is adapted for use in a particular location in the opening of a structure to be protected against wind and rain, for example around the glass of a window in a vehicle's door, or around the opening (at the periphery) in which the door is closed, so as to present at least one sealing surface against which the glass or door may be abutted to provide a seal against the elements. A slip-coating is co-extruded onto one or more longitudinal sealing surfaces of the body; the slip-coating contains a novel compatibilizer which allows thermoplastic polyurethane (TPU) to be chemically bonded to a graft copolymer of polypropylene (PP) and a compound having two anhydride groups. The reaction product of the grafted PP and the TPU effects a thermal bond with the sealing surface of the body. The slip-coating has a combination of softness and abrasion resistance which are uniquely suited for the purpose of the weatherseal.

6 Claims, 2 Drawing Sheets

OLEFINIC SLIP-COATING FOR AUTOMOTIVE WEATHERSEALS

FIELD OF THE INVENTION

This invention relates to a weatherseal for an opening in a structure the interior of which is to be protected against wind and rain. The weatherseal preferably having a relatively soft extrudate body, a portion of which is coated with a slip-coating of relatively harder elastomer, is formed as an extrudate of relatively hard elastomer thermally bonded as a slip-coating and forming an integral portion of a softer polymer. The slip-coating not only exhibits low frictional characteristics and high abrasion resistance but also remarkable softness compared to that of conventional slip-coatings.

The Problem

Though available elastomers of extrudable thermoplastic vulcanizates (TPVs) are commonly used to produce weatherseals, the ever-increasing demands of the marketplace seeks weatherseals with improved properties. Properties which are currently accepted but seek improvement are found in TPV weatherseals having an elongate body or base portion which have been co-extruded with slip-coatings having a hardness of at least 50 Shore D, Taber abrasion resistance measured at 500 cycles of at least 50, and a coefficient of friction greater than about 0.3. Though it is known that any one of the foregoing properties can be lowered, it is not known how to lower all three properties and still produce a marketable weatherseal.

The goal is to produce a slip-coating which provides an exceptionally good seal against entry of wind, snow and rain because of a critical combination of three specific properties, namely softness, good abrasion resistance, and low coefficients of friction; and to formulate the slip-coating containing a TPV which allows it to be thermally bonded to the body so as to become an integral part of it, and to be pigmented or painted with colors of choice.

BACKGROUND OF THE INVENTION

The term "elastomer" is used in the broad sense, in that the cured blend is extrudable as a dense solid TPV essentially free of macroscopic voids, or a dense foam having a density in the range greater than about 80% of that of the dense solid, and the TPV is re-processable, unlike a thermoset resin. By "extrudable" is meant that a vulcanized blend can be processed in an available, commercial extruder or injection molding machine which provides internal mixing at a temperature in the range from about 180° C. to 240° C. with a residence time less than 5 min, preferably in the range from 30 sec to 2 min. In such TPVs, which are "self-cured" and not physical blends, their combination of desirable elastic and thermoplastic properties depends on the respective amounts of "hard" and "soft" phases provided by each component, and the properties of each component. The polyolefin phase is the continuous "hard" phase in which the rubber "soft" phase is present as discrete particles. By varying the ratios of the components, one may provide desired hardness/softness, oil and temperature resistance, oxidation resistance, and extrudability, inter alia.

Commonly used weatherseals are provided with a flock or fibrous nap against which the glass of an automobile's window abuts; though effective, the nap suffers from repeated use, either being abraded away or being worn off. Moreover the process for depositing the nap is complicated and expensive.

The term "weatherseal" refers to an extrudate of elastomer intended for use in any application where metal or glass parts are used with the extrudate in abutting contact therebetween, typically in the window of a vehicle, or for a belt-line seal for a door. Weatherseals are known to be co-extruded, being formed with a base portion made of a hard polymer, and a support portion made of a soft polymer, either or both of which are coated with a coating which is a blend of two resins having different melting points (see U.S. Pat. No. 5,343,655 to Miyakawa et al). The term "co-extruded" is used herein to describe the substantially concurrent extrusion of a body or support portion from one barrel and the extrusion of an elastomer slip-coating from a second barrel, the slip-coating to be integrally bonded to the body or support portion. The coating may also be provided as a batten surface layer comprising nylon, polyurethane, fluoro-resin, polystyrene or polyolefin containing particles of mica, molybdenum and/or graphite to form a rough surface with projections and recesses (see U.S. Pat. No. 5,441,685). For example a filler of molybdenum disulfide particles provides a tape of a fluorocarbon polymer with lubricity. Adhesively securing a tape of one of the foregoing polymers (as the batten surface) to a base weatherseal requires coating the base with an adhesive, and additional steps; and securing the tape to curved or complex surfaces is difficult. Another coating provided as a batten surface layer has been co-extruded with a guide edging member using small and large particles of nylon 11 and/or 12, or a polyolefin mixed with small and large particles of nylons 6 and/or 66 or a fluorocarbon resin, having high melting points (see U.S. Pat. No. 5,447,671).

Still another weatherseal is provided by co-extruding a base polyolefin elastomer to form a support body which is coated with a co-extruded protective film of a mixture consisting of a polyolefin-based resin having low viscosity and high fluidity, and grains of particles of an additive material which is a polyolefin-based resin having high viscosity and low fluidity (see U.S. Pat. No. 5,424,019). More specifically, the base material for the protective film is polyethylene (PE) having a melt flow rate greater than 0.6 g/10 min (ASTM D 1238 190° C.) and the additive material is in the form of grains and particles of a high viscosity PE having a melt flow rate less than 0.1 g/10 min.

The co-extrusion and thermal bonding of a slip-coating to a body or base portion of a weatherseal is conventional and essentially the same or similar equipment as used in the '019 patent is used in the process of this invention. A protective layer may also be provided with a layer of crystalline polyolefin and a rubber, and a layer of an ultrahigh molecular weight polyolefin which contacts the glass (see EP 0 860 314 A1).

Still another slip-coating is provided with a TPV of chosen hardness, typically 50 Shore D, blending it with a thermoplastic polyolefin resin and doctoring the blend with various plasticizers, and fillers such as fatty acid amides and organopolysiloxanes to get the desired low coefficient of friction, also referred to as lubricity. (see Japanese Patent Application No. 7-346094 and JP 9176408A). The effect of the addition of a semicrystalline polyolefin in combination with a plasticizer and a filler to a TPV is improved abrasion resistance and lubricity (low coefficients of friction). There is no suggestion that inclusion of a thermoplastic polyurethane (TPU), normally incompatible with such a TPV, may provide any benefit, particularly when the TPV includes a minor proportion by weight of a semicrystalline polyolefin copolymer. However, not only does the melt-blend of a TPV with a compatibilized TPU exhibit excellent abrasion resistance and lubricity, but it also has the ability to be integrally bonded to a TPV. Moreover, the novel TPV containing the compatibilized TPU can be colored either by inclusion of a pigment of choice, or by being painted with appropriate commercially available paints, particularly urethane-based paints. When the olefin copolymer is omitted from the melt-blend the slip-coating has unacceptable Taber abrasion.

None of the prior art weatherseals provides an elongate body with a coextruded glass-abutting layer which is softer than 50 Shore D but has a Taber abrasion which indicates abrasion damage low enough to indicate that the slip-coating is neither worn away, or torn off. In addition, prior art weatherseals formed with a co-extruded slip-coating deliberately formulated to have a hardness lower than 50 Shore D are found to have unacceptably poor Taber abrasion (measured by ASTM D 1044-94), or poor friction characteristics which cause "sticking" of the glass to the weatherseal, particularly on hot days when the glass is exposed to bright sun. If formulated to have a hardness higher than 50 Shore D, the weatherseal tends to leak in locations where the glass does not press against the sealing surface either sufficiently evenly, or firmly. Moreover weatherseals harder than 50 Shore D lack "good hand" and fail to be squeak-free on either a hot day or a cold day. No prior art glass-abutting surface has the critical combination of softness, good abrasion resistance and lower coefficients of friction, provided by the weatherseal of this invention.

It is known that PP may be modified by grafting an unsaturated monomer bearing an acid anhydride group to the PP, and reacting the graft (referred to as "mPP") so formed with an a polymer having at least two groups which are reactive to the anhydride group (see U.S. Pat. No. 4,735, 992) but there is no suggestion that the reaction product of a mPP and a thermoplastic polyurethane may be incorporated in a melt-blend of a TPV to provide a slip-coating which is uniquely adapted for use on a weatherseal.

SUMMARY OF THE INVENTION

It has been discovered that the base of a weatherseal formed from a "first TPV", may have thermally bonded to it a slip-coating of a copolymer layer containing thermoplastic polyurethane (TPU); the slip-coating is formed by melt-blending a "second TPV" with a reaction product of (i) a graft copolymer of polypropylene (PP), (ii) a thermoplastic polyurethane (TPU) and (iii) a random copolymer of two or more $\alpha$-olefins having from 2 to about 12 carbon atoms; the graft copolymer functions as a compatibilizer allowing TPU which is normally incompatible with an olefin-based TPV to be molecularly connected in the slip-coating. The combination of specific properties of the slip-coating is as follows: hardness lower than 50 Shore D, preferably in the range from 85 Shore A to 45 Shore D; a Taber abrasion resistance (measured at 500 cycles) in the range from about 15 to about 50; and coefficients of friction, both static and dynamic, in the range from about 0.1 to 0.4. This combination of properties provides smooth contact with, and release of a glass-abutting or door-abutting surface of the weatherseal; longevity in use; a paintable surface; excellent "freeze release", that is minimal sticking of the slip-coating to the surface of the window-glass or door; and no squeak when the window-glass is raised or lowered.

The foregoing combination of properties is found to be provided by a slip-coating comprising (i) an olefin-based thermoplastic elastomer (TPV) having a hardness in the range above 85 Shore A but below 50 Shore D, (ii) a melt-blended reaction product of a graft copolymer of PP and a TPU which is otherwise incompatible with a TPV whether the rubber in the TPV is EPDM or butyl rubber, and (iii) from 5 to 30 parts of an $\alpha$-olefin copolymer per 100 parts of slip-coating. The reaction product (referred to as mPP-g-TPU) is preferably formed by melt-blending and thermally copolymerizing (i) a minor portion by weight of commercially available pellets, or a powder, of a high molecular weight polypropylene (PP) modified by grafting a monomer bearing an anhydride group (mPP) with (ii) a major portion by weight of commercially available pellets of a compound having at least two groups which are reactive with the anhydride group, preferably thermoplastic polyurethane (TPU). The mPP-g-TPU functions as a compatibilized TPU melt-blended with a second TPV in the slip-coating, allowing it to be thermally bonded to a first TPV extrudate of arbitrary length, and at the same time the mPP-g-TPU functions as a viscosity reducer which reduces the viscosity of the melt-blend (of second TPV with mPP-g-TPU). The ratio of second TPV to mPP-g-TPU is in the range from 20: 1 to 1: 20. The melt-blend of second TPV and mPP-g-TPU has a viscosity lower than that of the first TPV which is extruded in a cross-section suitable for its intended purpose in the window of a vehicle, or a belt-line seal for a door.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
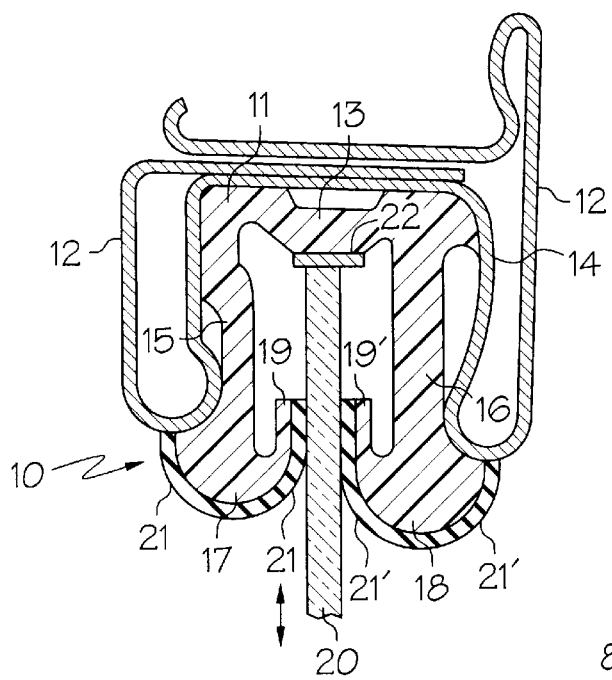
FIG. 1 is a vertical cross-section illustrating a co-extruded weatherseal such as is conventionally used in the upper portion of a window provided in a vehicle's door and within which weatherseal the upper portion of the window's glass is sealingly held.

In its most preferred embodiment the invention is a weatherseal coated with a slip-coating of a TPU-containing copolymer layer; in another embodiment, an article is made from the TPU-containing copolymer, such as one requiring flexibility which withstands repeated elongation and which is subjected to abrasion. Such an article is an expansible bellows used as a boot for a rack and pinion assembly, a boot for a constant velocity joint, a dust cover for a shock absorber, and the like. Each is subject to abrasion due to friction generated when the expansible bellows are squeezed together.

The Components

In the melt-blended olefin-based elastomer (whether first or second TPV) the preferred olefin is PP though it may include a minor proportion of polyethylene (PE), and the preferred rubber is selected from the group consisting of an ethylene-propylene-non-conjugated diene (EPDM) rubber and butyl rubber, the remainder being: processing oil or ester which functions as a viscosity modifier, fillers, colorants, curing agent, antioxidants and other ingredients. Essential ingredients are the polyolefin, the rubber and processing oil, the remainder being chosen to meet the specific requirements for a particular intended use or purpose. The most preferred range of essential components based on the 100 parts by weight of the formulated TPV elastomer, are as follows: from about 15% to 60% olefin; from about 10% to 35% EPDM rubber; and from about 15% to 45% processing oil. Such an olefin-based elastomer having a melting point in the range from about 130° C. to 180° C. is present in a major amount by weight in the body as well as the slip-coating of the weatherseal.

The first and second TPVs are most preferably chosen from elastomers commercially available under the Santoprene® trademark. The hardness of the first TPV for the body of the weatherseal is preferably less than 60 Shore D; the hardness of the second TPV for the slip-coating is less than 50 Shore D. The oil or ester is selected from synthetic hydrocarbon oils that are branched (for example, poly $C_8$–$C_{12}$ α-olefins); or, oils where the molecular structure is mostly hydrocarbon, but contains a limited amount of bound polar organic groups. Suitable oils in this application do not exude from the weatherseal when exposed to a bright sun for an entire year.

The slip-coating is bonded to chosen surfaces of the body of the extrudate; in a specific example the slip-coating comprises a melt-blended TPV in combination with the mPP-g-TPU in which mPP is most preferably, maleated polypropylene. The α-olefin copolymer is present in a minor proportion by weight relative to the TPV, preferably less than 30 parts per 100 parts of TPU-containing copolymer, so that it (the TPU-containing copolymer) most preferably has a hardness in the range from about 30 Shore D to 45 Shore D.

The Body of the Weatherseal

The body of the weatherseal is provided by a commercially available, extrudable first TPV the composition of which is not narrowly critical but is preferably formed from the components described below. The extrudate body may have a wide range of hardness from about 35 Shore A to 80 Shore D, depending upon the particular application, but for use as a belt-line seal, or in a channel for the glass of a window, the body is relatively soft, preferably in the range from about 50 Shore A to 35 Shore D. The cross-section of the body is adapted to be held in or on a particular portion of an opening which is to be sealed against the weather.

The Slip-Coating of TPU-containing copolymer

The slip-coating is provided by an elastomer layer of a second TPV which is melt-blended with mPP-g-TPU; the second TPV may be the same as or different from the first TPV used for the body. The compatibilized TPU makes it possible to chemically integrate a large amount of TPU with the first and second TPVs. The PP may be grafted with any cyclic acid anhydride group such as maleic, citraconic, 2-methylmaleic, 2-chloromaleic, 2-methoxycarbonylmaleic, 2,3-dimethoxycarbonylmaleic, and the like. In its most preferred embodiment a maleated PP (that is, PP grafted with maleic anhydride) compatibilizer is melt-blended with a TPU having a molecular weight in the range from 5,000 to 100,000. The TPU is present in the range from about 40 to 99 parts by weight, more preferably in the range from above 50 to about 95 parts TPU per 100 parts of compatibilizer, the remainder being mPP; and the maleic anhydride in the mPP is present in the range from 0.1 to 2%, more preferably in the range from 0.3 to about 1.5%. The mPP has a melt flow index in the range from 10 to 1000.

The a-olefin copolymer is formed with a minor proportion of ethylene, and one or more higher olefins which are together present in a major amount; higher olefins include propylene, 1-butene, 1-pentene, 1-hexene, 2-methyl-1-propene, 3-methyl-1-pentene, 4-methyl-1-pentene, 5-methyl-1-hexene, 1-octene and 1-nonene. Homopolymers of an α-olefin are too crystalline and produce a slip-coating composition which has excellent lubricity but a hardness greater than 50 Shore D. Most preferred are commercially available copolymers of ethylene and a higher α-olefin in which the higher olefin is present in the range from 70 to 99%, preferably 80 to 98%, as exemplified by propylene-ethylene copolymers (PP-co-PE) and ethylene-octene copolymers (PE-co-PO).

In addition to the essential components identified above in the slip-coating composition, the TPU-containing copolymer may include an additive selected from the group consisting of a plasticizer, filler and lubricant, any one of which may be present in no more than 10 parts by weight per 100 parts of TPU-containing copolymer. Suitable plasticizers are conventional paraffinic, naphthenic and aromatic processing oils.

Suitable fillers include calcium silicate, clay, kaolin, talc, silica, diatomaceous earth, powdered mica, barium sulfate, aluminum sulfate, calcium sulfate, basic magnesium carbonate, glass fibers, and carbon fibers, provided the filler is used in an amount small enough not to adversely affect either the hardness or the coefficients of friction of the TPU-containing copolymer.

Preferred silicas which may be used are micronized silica, fumed silica, a dry process white carbon referred to as "white carbon", a wet-process white carbon, and synthetic silicate-type white carbon. Silica increases the Taber abrasion of the elastomer but improves its sliding and wear properties, that is, lowers coefficients of friction. Preferably the silica or any other filler is used in an amount small enough not to adversely affect either the hardness or the coefficients of friction, no more than 10 parts, preferably 0.5 to 5 to parts per 100 parts of TPU-containing copolymer.

Suitable inorganic lubricants are molybdenum disulfide and graphite; organic lubricants include higher fatty acids such as stearamide, oxystearamide, oleylamide, erucylamide, laurylamide, palmitylamide, and behenic amide; methylol amides; amide types of higher fatty acids such as methylene-bis-stearamide, ethylene-bis-stearamide, ethylene-bis-oleamide, and ethylene-bis-laurylamide; composite-type amides such as stearyloleylamide, n-stearylerucylamide and N-oleylpalmitylamide; and special fatty amides commercially available under the trade name "Plastrodine" and "Plastrodine S" (Fujisawa Pharmaceutical Co., Ltd.). Preferably lubricant is used in an amount small enough not to adversely affect either the hardness or the coefficients of friction, no more than 10 parts, preferably 0.5 to 5 parts per 100 parts of TPU-containing copolymer.

Useful organopolysiloxanes are dimethyl polysiloxane, methylphenyl polysiloxane, methylhydrogen polysiloxane and modified polysiloxanes such as epoxy-modified, alkyl-modified, amino-modified, carboxyl-modified, alcohol-modified, fluorine-modified, alkylarylkyl polyether-modified, epoxy polyether-modified, and polyether-modified polysiloxanes. Preferably the organosiloxane is used in an amount small enough not to adversely affect either the hardness or the coefficients of friction, no more than 10 parts, preferably 2 to 8 parts per 100 parts of TPU-containing copolymer.

The Process

The process for making a weatherseal comprises, (i) melt-blending a first TPV in a first barrel to form a first TPV melt (ii) extruding the first TPV melt under suitable extrusion conditions through a first extrusion die of predetermined cross-section to form the body of the weatherseal; (iii) melt-blending a second TPV, the same as or different from the first, in a second barrel to form a second TPV melt (iv) extruding the second TPV melt under suitable extrusion conditions through a second extrusion die of predetermined cross-section to form a slip-coating (v) contacting the body portion with the slip-coating (vi) and recovering a weatherseal having its body integrally bonded to the slip-coating, the weatherseal having the desired cross-section and the slip-coating presenting the desired surface-abutting surface.

The Weatherseal

Referring to FIG. 1 there is illustrated a weatherseal referred to generally by reference numeral 10, formed by extruding a first TPV so as to have a body 11 which is snugly fitted into the upper portion 12 of the frame of a vehicle's window. The cross-section of such a weatherseal will vary depending upon the channel in which it is to be held, but in general the cross-section is channel-shaped, and whether only sides of the channel are coated, or the bottom of the body is also coated, depends on whether the weatherstrip is to be used in the sides of the window, or in its upper portion. In FIG. 1, where it is used in the U-shaped channel 14 in the upper portion 12 of a window, a bumper portion 13 of the body 11 is preferably snugly held so as to have the upper edge of window glass 20 bump against the lower surface of the bumper portion. The weatherseal may also be attached with suitable fastening means (not shown) or with adhesive. The sides 15 and 16 of the body extend downward on either side of the upper edge of the glass 20 in its raised position. The lower ends 17, 18 of each side are shaped so that their outer surfaces (relative to the central vertical axis) are snugly fitted against the inner surfaces of the channel 14. The inner portions of the lower ends 17, 18 of each side 15 and 16 respectively, are shaped so as to present vertical stubs 19 and 19' which matingly secure the glass 20 therebetween.

The inner opposed surfaces of each stub 19, 19' has a slip-coating 21, 21' co-extruded thereon so that when the glass 20 is raised, as indicated by the arrow, it slides in contact between opposed slip-coated inner surfaces of the stubs 19, 19'. During the co-extrusion, it is convenient to allow the slip-coating 21, 21' to be co-extruded on the outer downward facing surfaces of each lower end as well. A slip-coating 22 is co-extruded onto the lower inner surface of the bumper portion 13 so as to allow the glass 20 to be seated against 22. It will now be evident that raising and lowering the glass causes abrasion damage on the opposed surfaces of the lower ends, and that a high coefficient of friction will cause the stubs 19 and 19' to be pulled down when the glass is lowered, deforming or damaging them. A high coefficient of friction is not nearly as damaging when the glass is raised.

Figure 2:
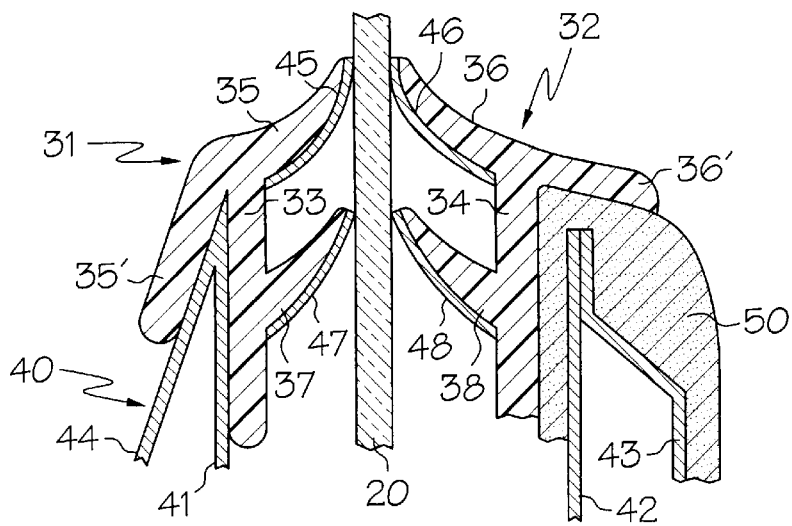
FIG. 2 is a vertical cross-section illustrating a co-extruded weatherseal such as is conventionally used in the lower portion of a window provided in a vehicle's door and within which weatherseal the lower portion of the window's glass is sealingly held when the glass is either raised or lowered.

Referring to FIG. 2 there is illustrated a window glass 20 held between weatherseals 31, 32 which, in turn are securely held in the horizontal lower walls 41, 42 of a door panel 40 of a vehicle. Each weatherseal, as installed in the door panel, is a substantially F-shaped mirror image of the other; each has vertical portions 33, 34 terminating in upper portions which include upper glass-abutting stubs 35, 36. Each weatherseal also includes lower glass-abutting stubs 37, 38 below the stubs 35, 36 respectively. The lower surfaces of the upper stubs 35 and 36 are provided with slip-coatings 45 and 46 respectively; and the lower surfaces of the lower stubs 37 and 38 are provided with slip-coatings 47 and 48 respectively. The door panel 40 is preferably fitted with a complementary weatherseal 50 which is fitted around the walls 42, 43 of the outer door panel; and a lower portion 36' of the upper glass-abutting stub 36 snugly overlies the complementary weatherseal 50, anchoring the weatherseal 32. To anchor the weatherseal 31, a lower portion 35' of upper glass-abutting portion 35 snugly overlies inner wall 44 of the door panel 40.

Figure 3:
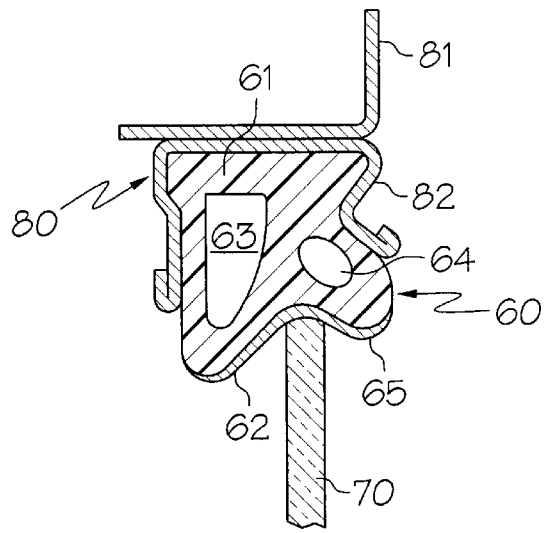
FIG. 3 is a vertical cross-section illustrating another co-extruded weatherseal such as is conventionally used on either side of a window provided in a vehicle's door and in which weatherseal the side edges of the window's glass is sealingly held and reciprocated.

Another embodiment of an upper weatherseal used around an access-opening is illustrated in FIG. 3 in which the weatherseal 60 seals the periphery of a glass window 70 which does not run in channels. Illustrated is the upper portion of a structure 80 in which a generally U-shaped channel 82 depends from a panel portion 81. The channel 82 is shaped to have a cross-section corresponding to that of weatherseal 60 the base 61 of which is snugly secured around its base and sides in the channel 82. The lower surface of the lower portion 62 is coated with a slip-coating 65 and the body is provided with longitudinal through-passages 63, 64 to allow the body 60 to be compressed by the upper edge of the glass window 70.

Figure 4:
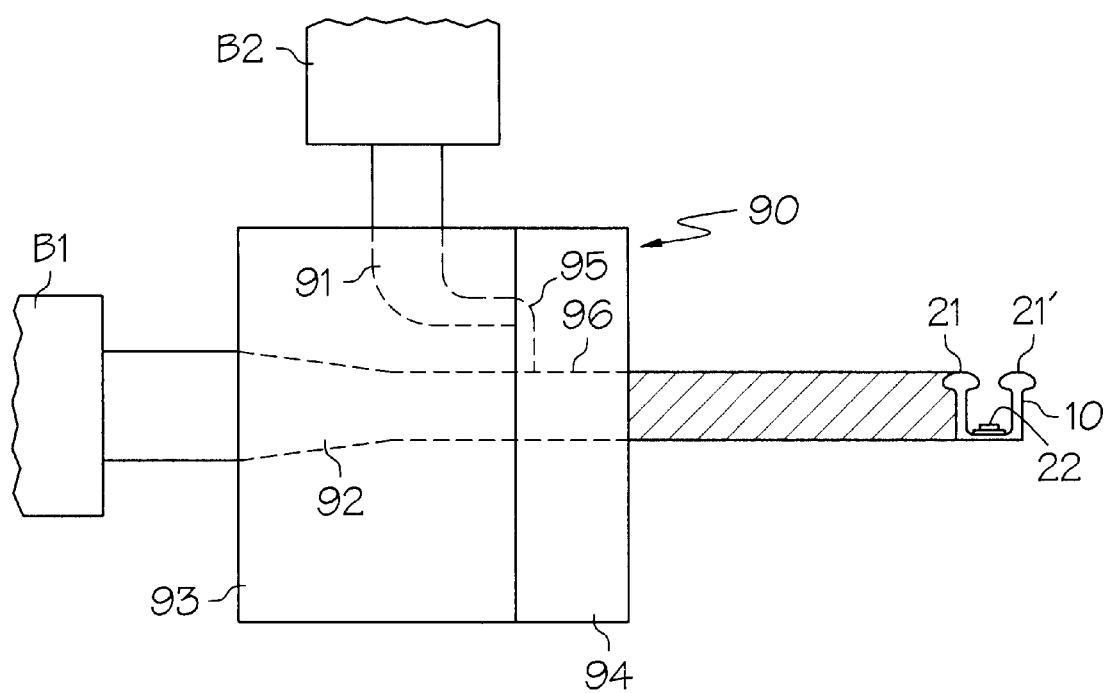
FIG. 4 is a schematic illustration of a slip-coating die in which an extrudate of a body of an extrudate from a first barrel of an extruder is coated with a slip-coating produced in a second barrel of an extruder.

As stated above, the co-extrusion of the slip-coating 21, 21' and 22 onto weatherseal 10 is effected in a conventional split block slip-coating die 90 comprising die blocks 93 and 94 illustrated in FIG. 4. Die block 93 is provided at a first surface with an entry port for the body 11 of extrudate from barrel B1 of an extruder and, at a second surface displaced 90° from the first, with an entry port for a slip-coating from barrel B2 of an extruder. Die block 94 is provided with slots 95 to deposit the desired width and thickness of slip-coatings 21, 21' and 22 on chosen longitudinal surfaces of the weatherseal 10; and die block 94 has an axial extrusion port 96 shaped to conform to the desired dimensions of the U-shaped weatherseal.

In the following illustrative examples, all references to "parts" are to "parts by weight". All slip-coatings were produced in a 2" diameter staged, single step twin-screw extruder in which three zones in the barrel were maintained at temperatures in the range from 160° C. to 200° C. in the first zone, 170° C. to 200° C. in the second zone, and 180° to 200° C. in the third zone. The time during which the TPV stayed in the barrel range from about 2 min to 8 min.

Abrasion resistance is measured by the Standard Test for Resistance of Transparent Plastics to Surface Abrasion, ASTM D 1044-94, limited to 500 cycles. Abrasion damage is judged by that percentage of transmitted light which, in passing through the abraded track, deviates from the incident beam by forward scattering; only light flux deviating more than 0.044 rad (2.5°) on the average is considered in this assessment of abrasive damage.

Static and dynamic coefficients of friction are measured by the Standard Test Method for Static and Kinetic Coefficients of Friction of Plastic Film and Sheeting, designated ASTM D 1894-90. This test method covers determination of the coefficients of starting and sliding friction of plastic film and sheeting when sliding over itself or other substances at specified test conditions. The procedure permits the use of a stationary sled with a moving plane, or a moving sled with a stationary plane. Since both procedures yield the same coefficients of friction values for a given sample, the latter is used.

In the following Table 1 three prior art slip-coatings are prepared by melt-blending commercially available TPVs with a commercially available random copolymer of predominantly PP and a minor proportion of PE. A slip-coating is obtained by doctoring the blend with a silica filler, fatty acid amide and a silicone to lower its coefficients of friction and provide reasonable resistance to abrasion damage.

TABLE 1

| Slip-coating No. | 1 | 2 | 3 |
|---|---|---|---|
| Santoprene ® 123-50 | 80 | — | — |
| Santoprene ® 101-87 | — | 72 | 80 |
| Escorene PD9012 | 20 | 20 | 20 |
| Hisil 233 | 4 | | 4 |
| Kemamide E | 4 | 2 | 0.5 |
| Silicone MB50-001 | — | 6 | 6 |
| Properties | | | |
| UTS, psi | 2090 | 2620 | 2730 |
| % Elongation | 215 | 570 | 610 |
| M100%, psi | 2100 | 1300 | 1270 |
| Hardness, Shore D | 54D | 43D | 42D |
| Static COF | 0.3 | 0.48 | 0.39 |
| Kinetic COF | 0.26 | 0.43 | 0.35 |
| Taber Abrasion (@ 500 cycles) | 77 | 50 | 40 |

Notes:
123-50 and 101-87 are 50 shore D and 87 Shore A Santoprene elastomers which are dynamically vulcanized alloys of polypropylene and EPDM
Hisil 233 is silica
Kemamide E is Erucylamide from Witco Corporation
Silicone MB 50-001 is a silicone masterbatch from DowCorning.

It is evident that using a hardness of 50 Shore D (Santoprene 123-50) to lower coefficients of friction results in poor Taber abrasion resistance (the higher the number the greater the damage due to abrasion). Using a softer TPV Santoprene 101-87 (87 Shore A) and addition of the silicone does improve both % elongation and abrasion resistance but at the expense of increasing friction even when the Hisil 233 is retained.

In the following formulations of slip-coating the 87 Shore A TPV is retained to maintain the desirable low hardness, and softness is further contributed by a relatively large proportion of the mPP-g-TPU while maintaining the same proportion of random copolymer PP-co-PE.

TABLE 2

| Slip-coating No. | 4 Control | 5 | 6 | 7 |
|---|---|---|---|---|
| Santoprene ® 101-87 | 72 | 5 | 5 | 36 |
| Escorene ® PD9012 | 20 | | 15 | 20 |
| mPP-g-TPU | | 87 | 72 | 36 |
| Kemamide ® E | 2 | 2 | 2 | 2 |
| Hisil ® 233 | | | | |
| Silicone MB50-001 | 6 | 6 | 6 | 6 |
| Properties | | | | |
| Hardness, Shore D | 43 | 40 | 44 | 41 |
| Static COF | 0.48 | 0.35 | 0.15 | 0.16 |
| Kinetic COF | 0.43 | 0.42 | 0.17 | 0.17 |
| Taber Abrasion (@ 500 cycles) | 50 | 56 | 21 | 39 |

Notes:
PP-g-TPU was prepared by melt mixing maleated PP (Polybond ® 3000 from Uniroyal) and Thermoplastic urethane, Texin DP7 from Bayer
Samples were prepared on Brabender plasticorder and compression molded.

It is evident that using a hardness of 87 Shore A to improve softness and lower coefficients of friction results in excellent Taber abrasion resistance and the Hisil 233 is unnecessary. Though the same amount of silicone is added in each case, the abrasion resistance is best and COFs lowest when the mPP-g-TPU is combined with the random copolymer of PP and PE.

In three of the following formulations of slip-coating the EPDM rubber in the prior art cintrol Santoprene 101-87 was replaced by a Trefsin® TPV in which PP is melt-blended with butyl rubber. In slip-coating #9, mPP-g-TPU is substituted for one-half of the Santoprene in the control; the same amount of mPP-g-TPU is used in formulations 10–12, the remaining one-half being Trefsin butyl rubber elastomer. The control contains no Trefsin or mPP-g-TPU. As before the random copolymer of PP and PE is retained and except for the control, all slip-coatings contain the same amount of mPP-g-TPU.

TABLE 3

| Slip-coating No. | 8 Control | 9 | 10 | 11 | 12 |
|---|---|---|---|---|---|
| Santoprene 101-87 | 72 | 36 | — | — | — |
| Ampacet 49974 black | — | — | 5 | 5 | 5 |
| Trefsin W305 | — | — | 31 | — | — |
| Trefsin W306 | — | — | — | 3 | — |
| Trefsin W309 | — | — | — | — | 31 |
| Escorene PD9012 | 20 | 20 | 20 | 20 | 20 |
| PP-g-TPU | | 36 | 36 | 36 | 36 |
| Kemamide E | 2 | 2 | 2 | 2 | 2 |
| Hisil 233 | — | — | — | — | — |
| Silicone MB5001 | 6 | 6 | 6 | 6 | 6 |
| Properties | | | | | |
| Hardness, Shore D | 43 | 40 | 36 | 39 | 37 |
| Static COF | 0.48 | 0.18 | 0.27 | 0.3 | 0.31 |
| Kinetic COF | 0.43 | 0.19 | 0.33 | 0.32 | 0.42 |
| Taber @ 500 cycles | 50 | 36 | 43 | 58 | 54 |

Note to Table 3:
PP-g-TPU was prepared by melt mixing maleated PP (Polybond 3000 from Uniroyal) and Texin DP7 thermoplastic urethane from Bayer
Samples were prepared on a Brabender Plasticorder and compression molded.

What is claimed is:

1. A weatherseal for an opening in a structure the interior or which is to be protected against wind and rain, comprising, an extrudate body comprising a first olefin-based thermoplastic vulcanizate or elastomer (first TPV) having a hardness in the range from about 35 Shore A to 80 Shore D;

a slip-coating of a copolymer layer integral with said body, thermally bonded to chosen glass-abutting or door-abutting surfaces thereof, said slip-coating comprising (i) a second olefin-based thermoplastic vulcanizate or elastomer (TPV), the same or different from said first TPV, (ii) a reaction product of (a) a melt-blended copolymer of an unsaturated monomer bearing an acid anhydride group grafted to polypropylene, with (b) a thermoplastic polyurethane (TPU); and, (iii) a random copolymer of two or more a-olefins having from 2 to about 12 carbon atoms; said slip-coating having a hardness lower than Shore D 50, a Taber abrasion resistance (measured at 500 cycles) lower than 50, and coefficients of friction, both static and dynamic, lower than about 0.4.

2. The weatherseal of claim 1 wherein said body of first TPV has a hardness in the range from 35 Shore D to 60 Shore D;

said slip-coating has a hardness in the range from about 30 Shore D to about 45 Shore D;

said random copolymer is present in an amount from 5 to 30 parts per 100 parts of said slip-coating; and, said reaction product is formed by melt-blending a graft copolymer of maleated polypropylene with said TPU.

3. The weatherseal of claim 1 wherein said second TPV has a hardness in the range from about 85 Shore A to 45

Shore D and said copolymer is of ethylene and a higher α-olefin in which copolymer the ratio of the higher olefin to polyethylene is in the range from about 70 to 99%.

4. The weatherseal of claim 1 wherein a melt-blend of said second TPV and mPP-g-TPU has a viscosity lower than that of said first TPV.

5. The weatherseal of claim 1 wherein said slip-coating includes an additive selected from the group consisting of a plasticizer, a filler and a lubricant, any one of which is present in an amount small enough not to adversely affect either the hardness or the coefficients of friction, no more than 10 parts by weight per 100 parts of TPU-containing copolymer.

6. The weatherseal of claim 5 wherein said higher olefin is propylene, said filler is silica, and said lubricant is a fatty amide, each present in an amount in the range from about 0.5 to 5 parts per 100 parts of TPU-containing copolymer.

* * * * *